US010428198B2

(12) United States Patent
Boday et al.

(10) Patent No.: US 10,428,198 B2
(45) Date of Patent: Oct. 1, 2019

(54) ULTRAVIOLET LIGHT ABSORBING MATRIX-MODIFIED LIGHT STABILIZING SILICA PARTICLES

(71) Applicant: International Business Machines Corporation, Armonk, NY (US)

(72) Inventors: Dylan J. Boday, Tucson, AZ (US); Joseph Kuczynski, North Port, FL (US); Jason T. Wertz, Pleasant Valley, NY (US); Jing Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 15/008,256

(22) Filed: Jan. 27, 2016

(65) Prior Publication Data

US 2017/0210880 A1  Jul. 27, 2017

(51) Int. Cl.
| *C08K 3/36* | (2006.01) |
| *C09D 5/32* | (2006.01) |
| *C09J 201/00* | (2006.01) |
| *C09D 201/00* | (2006.01) |
| *C08K 9/06* | (2006.01) |
| *C09D 7/62* | (2018.01) |

(52) U.S. Cl.
CPC ............... *C08K 3/36* (2013.01); *C08K 9/06* (2013.01); *C09D 5/32* (2013.01); *C09D 7/62* (2018.01); *C09D 201/00* (2013.01); *C09J 201/00* (2013.01)

(58) Field of Classification Search
CPC .......... C08K 3/36; C08K 9/06; C09D 201/00; C09D 7/1225; C09D 5/32; C09J 201/00
See application file for complete search history.

(56) References Cited

U.S. PATENT DOCUMENTS

| 7,905,950 B2 | 3/2011 | Ito et al. |
| 7,919,176 B2 | 4/2011 | Wickramanayake |
| 8,592,521 B2 | 11/2013 | Higuchi |
| 8,921,505 B2 | 12/2014 | Kim et al. |
| 2003/0198801 A1* | 10/2003 | Wickramanayake ........ B41M 5/5218 428/331 |
| 2004/0105826 A1* | 6/2004 | Soane ............ A61K 8/11 424/59 |
| 2008/0233626 A1 | 9/2008 | Li |
| 2010/0003204 A1* | 1/2010 | Loy ............ A61K 8/585 424/59 |
| 2010/0021403 A1* | 1/2010 | Bonda ........... A61K 8/40 424/59 |
| 2010/0179249 A1* | 7/2010 | Schomaker ........ C08L 71/02 523/209 |
| 2013/0270457 A1* | 10/2013 | Boday ............ G01N 21/64 250/459.1 |
| 2015/0231380 A1* | 8/2015 | Hoang ............ A61M 35/006 604/3 |

FOREIGN PATENT DOCUMENTS

| CN | 102220101 B | 4/2013 |
| CN | 103740244 A | 4/2014 |
| JP | 2013190542 A | 9/2013 |
| WO | 2009099106 A1 | 8/2009 |
| WO | 2010001949 A9 | 1/2010 |

OTHER PUBLICATIONS

Richard J. Lewis, Sr. "Hawley's Condensed Chemical Dictionary, 12th Edition", John Wiley & Sons, Inc., New York p. 1198 (1993).*

* cited by examiner

*Primary Examiner* — Alexander C Kollias
(74) *Attorney, Agent, or Firm* — Patterson + Sheridan, LLP

(57) ABSTRACT

In an example, a silica particle includes a light stabilizer material and is matrix-modified to include an ultraviolet (UV) light absorbing material.

19 Claims, 3 Drawing Sheets

ULTRAVIOLET LIGHT ABSORBING MATRIX-MODIFIED LIGHT STABILIZING SILICA PARTICLES

I. FIELD OF THE DISCLOSURE

The present disclosure relates generally to ultraviolet (UV) light absorbing matrix-modified light stabilizing (UAMLS) silica particles.

II. BACKGROUND

Ultraviolet (UV) light absorbers may be useful to protect adhesives, plastics, coatings, and elastomers from damaging effects of outdoor weathering that may result from exposure to UV light. UV absorbers function by competitive absorption of damaging UV light. Combinations of UV absorbers with other kinds of light stabilizers, such as hindered amine light stabilizers (HALS), may be used to improve resistance to weathering. In a conventional formulation, such as in paint (e.g., a clearcoat formulation for an automotive application), UV absorbers and light stabilizers are both added to the formulation. The UV absorbers convert undesirable short wavelength light (e.g., UV light) into heat energy, and the light stabilizers capture free radicals.

III. SUMMARY OF THE DISCLOSURE

According to an embodiment, a silica particle including a light stabilizer material and a UV light absorbing material is disclosed. The silica particle is matrix-modified to include the UV light absorbing material.

According to another embodiment, a polymeric material is disclosed that includes a silica particle incorporated into a polymer matrix. The silica particle includes a light stabilizer and a UV light absorbing material, where the silica particle is matrix-modified to include the UV light absorbing material.

According to another embodiment, a process of forming a polymeric material is disclosed. The process includes forming a mixture that includes a monomer material and a silica particle. The silica particle includes a light stabilizer and a UV light absorbing material, where the silica particle is matrix-modified to include the UV light absorbing material. The process also includes polymerizing the mixture to form a polymeric material.

One advantage of the present disclosure is the ability to protect a material from the damaging effects of outdoor weathering associated with exposure to UV light using silica particles that include a light stabilizer material and that are matrix-modified to include a UV light absorbing material. Another advantage of the present disclosure is the ability to use the matrix-modified silica particles as rheology control additives.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

V. DETAILED DESCRIPTION

Figure 1:
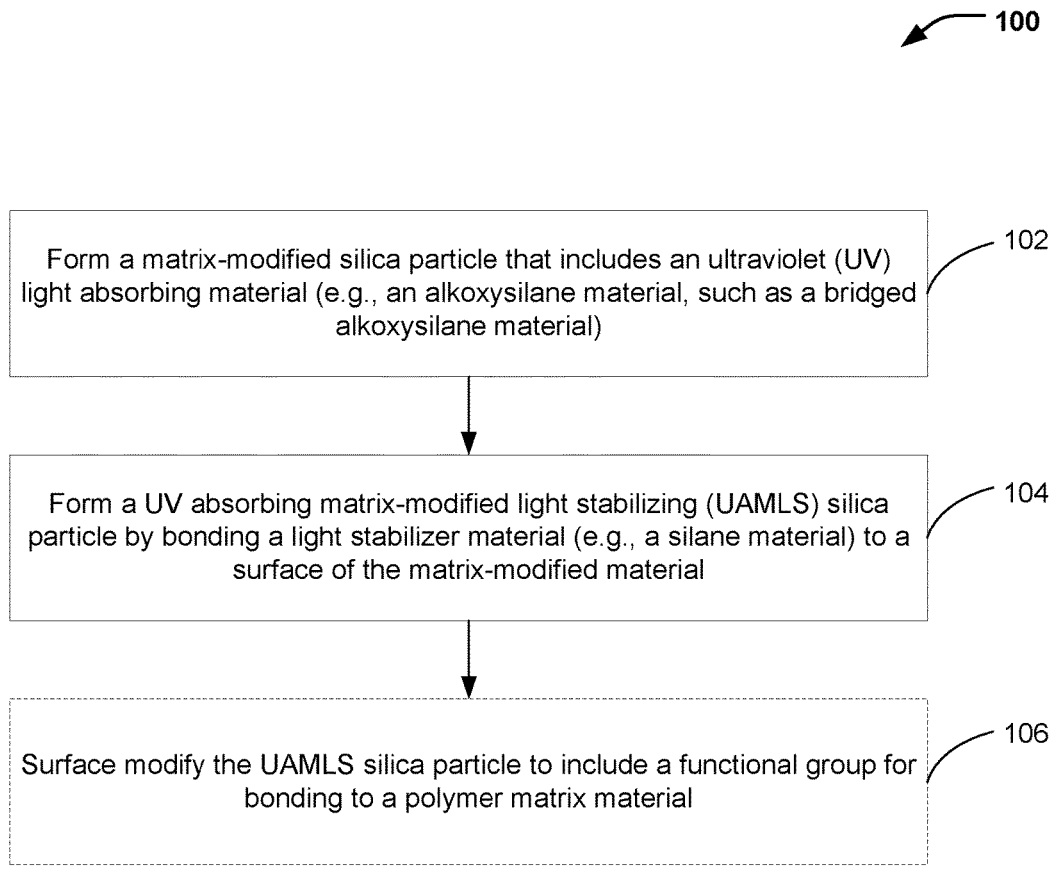
FIG. 1 is a flow diagram showing a particular embodiment of a process of forming a UAMLS silica particle that is matrix-modified to include a UV light absorbing material and that is surface-modified to include a light stabilizer material.

The present disclosure describes ultraviolet (UV) light absorbing matrix-modified light stabilizing (UAMLS) silica particles and processes for forming UAMLS silica particles. In some cases, a silica particle that is matrix-modified to include a UV absorbing material (for turning short wavelength light into heat) may be surface-modified to include a light stabilizer material (for capturing free radicals). Alternatively, a silica particle may be matrix-modified to include both a UV absorbing material and a light stabilizer material. The UAMLS silica particles of the present disclosure may be dispersed into various materials (e.g., adhesives, plastics, coatings, elastomers, etc.) to protect from the damaging effects of outdoor weathering that may result from exposure to UV light. The UAMLS silica particles of the present disclosure may further act as rheology controllers for the polymer matrices that the UALMS silica particles are blended into.

Ultraviolet light may be classified as Ultraviolet A ("UV A"), Ultraviolet B ("UV B"), or Ultraviolet C ("UV C"), depending on wavelength. UV A generally refers to long wavelength, black light that is not absorbed by the ozone layer, having a wavelength range of 400-315 nm and an energy per photon in a range of 3.10 eV to 3.94 eV. UV B generally refers to medium wavelength light that is partially absorbed by the ozone layer, having a wavelength range of 315-280 nm and an energy per photon in a range of 3.94 to 4.43 eV. UV C generally refers to short wavelength, germicidal light that is completely absorbed by the ozone layer and atmosphere, having a wavelength range of 280-100 nm and an energy per photon in a range of 4.43 to 12.4 eV. As UV C is absorbed by the ozone layer and atmosphere, only UV A and UV B are generally considered of concern with respect to UV damage.

As described further herein, a silica material may be manufactured using a modified Stöber process to incorporate UV absorbing molecules (e.g., one or more UV A absorbers and/or one or more UV B absorbers) into a matrix of the silica material. The UV absorber(s) turn short wavelength light (e.g., UV A and/or UV B light) into heat. To illustrate, an organic bridged UV silane dye may be added throughout the silica matrix to protect against UV A and/or UV B wavelengths. Additionally, as described further herein, the silica particles may be surface-modified or matrix-modified to include light stabilizing molecules to capture free radicals.

To improve resistance to UV weathering, typical formulations utilize UV absorbers and light stabilizers that are blended into a polymer matrix. Additionally, rheology controllers may be further blended into the polymer matrix. To illustrate, a typical clearcoat paint formulation may include one additive for UV absorption (e.g., hydroxyphenyl benzotriazole, substituted), another additive for light stabilization (e.g., a radical quencher, such as N-Methyl-2,2,6,6-tetramethylpiperidine-derivate), and yet another additive for control. By incorporating a UV light absorbing material and a light stabilizer material into a single particle, the UAMLS silica particles of the present disclosure may replace multiple separate additives. Replacing multiple separate additives may result in advantages associated with process simplification, cost savings (that may be associated with reduced processing time), or a combination thereof.

It may be difficult (or impossible) to modify a silica particle surface to include a sufficient amount of UV absorbing material(s) and light stabilizer material(s) due to steric hindrance and a limited number of surface sites available. Accordingly, in the present disclosure, a silica particle matrix may be modified to include at least UV light absorbing material(s) and optionally light stabilizer material(s) in order to allow a sufficient amount of UV light absorption and light stabilization properties to be incorporated into the silica particle. By first matrix-modifying the silica, there may be at least 50 percent more surface sites available compared to particles that are only surface-modified.

Referring to FIG. 1, a flow diagram illustrates a particular embodiment of a process 100 of forming a ultraviolet (UV) light absorbing matrix-modified light stabilizing (UAMLS) silica particle. In FIG. 1, the UAMLS silica particle is matrix-modified to include a UV light absorbing material and is surface-modified to include a light stabilizer material. FIG. 1 further illustrates that, in some cases, the UAMLS silica particle may be surface modified to include a functional group for bonding to a polymer matrix material.

The process 100 includes forming a matrix-modified silica particle that includes a UV light absorbing material, at 102. In some cases, a single UV light absorbing material may be incorporated into a matrix of a silica particle. In other cases, multiple UV light absorbing materials may be incorporated into a matrix of a silica particle. To illustrate, the UV light absorbing material(s) may include a UV A absorber, a UV B absorber, or a combination thereof. A UV A absorber may absorb UV A light in a first wavelength range of 315 nm to 400 nm. A UV B absorber may absorb light in a second wavelength range of 280 nm to 315 nm. While UV C light (in a third wavelength range of 100 nm to 280 nm) is absorbed in the ozone layer and atmosphere, it will be appreciated that a UV C absorber may also be used. In a particular embodiment, a modified Stöber process may be used to incorporate UV absorbing molecules into the matrix of the silica material.

In a particular embodiment, a UV absorbing material includes an alkoxysilane material, such as a bridged alkoxysilane material. To illustrate, an organic bridged silane dye that absorbs in a particular UV range may be added throughout the silica matrix. Examples of such dyes include: 1,2-bis(4-(triethoxysilyl)phenyl)ethene, 1,2-bis(4-(2-triethoxysilylvinyl)phenyl)diazene, 1,2-bis(4-(2-triethoxysilylvinyl)phenyl)ethene, 4,4'-bis(4-(triethoxysilyl)vinyl)biphenylene, 4,4'-bis(4-(triethoxysilyl)styryl)biphenylene, 9,10-bis(4-(triethoxysilyl)styryl)anthracene, 9,10-bis(4-(triethoxysilyl) vinylanthracene, and N,N'-bis(3-triethoxysilylpropyl)-perylene-3,4:9,10-tetracarboxdiimide and the trimethoxysilyl analogs of the above dyes.

As an illustrative, non-limiting example, a UV absorbing silane such as 4,4'-bis(4-triethoxysilyl)styryl)biphenylene may be incorporated into the Stöber synthesis. In this example, the silane has an excitation wavelength of about 390 nm at 1.0 mole percent in silica. As the excitation wavelength is about 390 nm, this UV absorber may be acceptable for protecting against UV A wavelengths (in a wavelength range of 315 nm to 400 nm). As another example, a UV B absorbing silane may include triethoxy (phenyl)silane. Other UV absorbers may also be chosen to protect against other UV A wavelengths and UV B wavelengths. The amount of UV absorber may be varied, but less than 1.0 mole percent may be acceptable (in some cases). Particle size may be controlled using chemical concentration. For example, in the Stöber process, the concentration of water can be used to vary particle size. In a particular embodiment, the silica particle may be a silica "nanoparticle" having a characteristic dimension (e.g., an average diameter of a substantially spherical silica particle) in a range of 1 nm to 100 nm.

In the embodiment illustrated in FIG. 1, the process 100 includes forming a UAMLS silica particle by bonding a light stabilizer material to a surface of the matrix-modified material, at 104. As further described herein with respect to FIG. 2, in other cases, the light stabilizer may be incorporated into the matrix of the silica particle (e.g., using a modified Stöber process that includes both the UV absorber(s) and the light stabilizer).

After creation of the UV absorber matrix-modified silica, the surface may be modified to allow the silica to act as a light stabilizer within polymeric applications. An illustrative, non-limiting example of surface modification may include the use of 4-(3-(dimethoxy(methyl)silyl)propoxy)-2,2,6,6-tetramethylpiperidine. Other examples may include the use of bis(3-hydroxy-4-benzoylphenoxy) diphenyl silane and/or bis(3-hydroxy-4-benzoylphenoxy) dialkyl(R) silane (where the R groups in the compounds include ethoxy groups, as examples). It will be appreciated that other light stabilizers (or combinations of stabilizers) may be selected. Further, the surface may also contain reactive groups for bonding with a polymer matrix. An amount of UV absorbing/light stabilizing silica that is utilized may vary based on properties of a particular polymer application and the particle size. Further, the UAMLS silica particles can be used to control the rheological properties of the polymer matrix that the UAMLS silica particles are blended into.

In the particular embodiment illustrated in FIG. 1, the process 100 further includes surface modifying the UAMLS silica particle to include a functional group for bonding to a polymer matrix material, at 106. The particular functional group (or groups) that are added to the surface of the UAMLS silica particle may vary depending on the particular polymer matrix material that the UAMLS particle is to be bonded into.

Example 1: Matrix Modification to Include UV Absorber(s); Surface Modification to Include Light Stabilizer(s)

To a glass vial, 2M ammonia and water may be added to generate an ammoniacal solution. To a second vial, tetraethyl orthosilicate, 200 proof ethanol, and a bridged UV absorber silane (e.g., less than 1.0 mole percent) may be added to generate a monomer solution. The ammoniacal solution may be added to the monomer solution and stirred vigorously (e.g., for about 24 hours) or left static (e.g., for about 24 hours). Particles may be centrifuged, washed, and dried to remove unreacted silane. The particles may be re-dispersed in a solvent, and a light stabilizer silane may be added and stirred (e.g., for several hours). The particles may be centrifuged, washed, and dried to yield UAMLS nanoparticles. Optionally, the UAMLS nanoparticles may be modified to include a functional group for bonding to a polymer matrix.

Thus, FIG. 1 illustrates an example of a process of forming a UAMLS silica particle that matrix-modified to include a UV light absorbing material (or multiple UV absorbing materials, such as a UV A absorber and a UV B absorber) and that is surface-modified to include a light stabilizer material. The UV light absorbing material(s) convert short wavelength light into heat, and the light stabilizer material captures free radicals. The matrix/surface modified UAMLS silica particles formed according to the process illustrated in FIG. 1 can be blended with polymers, thus acting as rheology controllers and protecting the polymers from UV damage when exposed to UV light.

Figure 2:
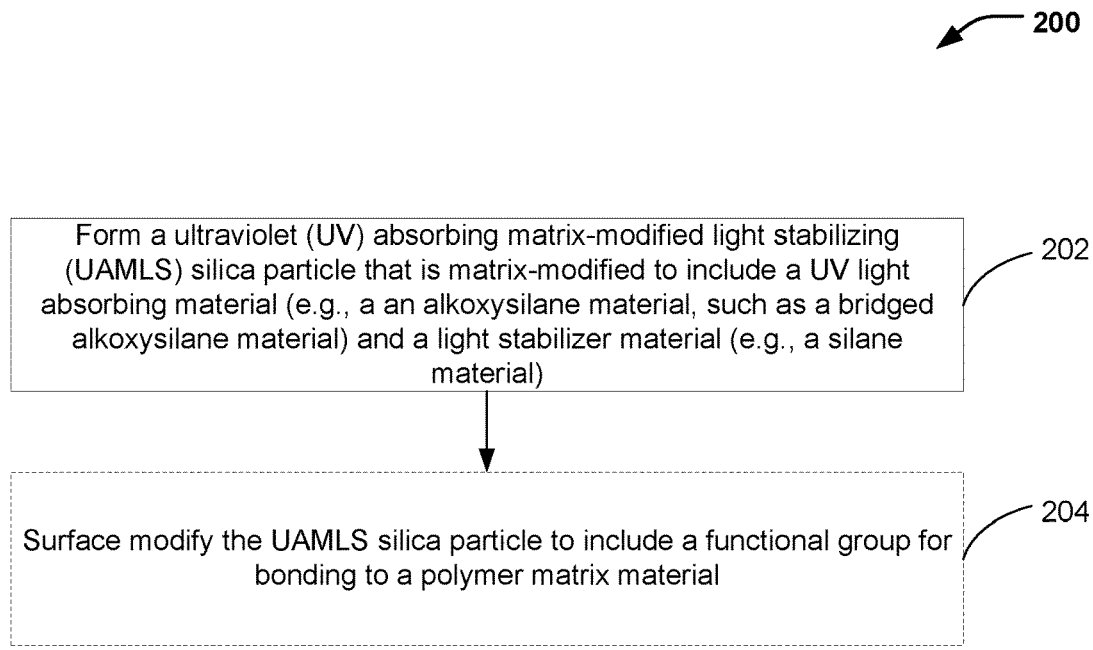
FIG. 2 is a flow diagram showing a particular embodiment of a process of forming a UAMLS silica particle that is matrix-modified to include a UV light absorbing material and a light stabilizer material.

Referring to FIG. 2, a flow diagram illustrates a particular embodiment of a process 200 of forming a UAMLS silica particle. In FIG. 2, the UAMLS silica particle is matrix-modified to include a UV light absorbing material and a light stabilizer material. FIG. 2 further illustrates that, in some cases, the UAMLS silica particle may be surface modified to include a functional group for bonding to a polymer matrix material.

The process 200 includes forming a UAMLS silica particle, at 202. The UAMLS silica particle is matrix-modified to include a UV light absorbing material (or multiple UV light absorbing materials) and a light stabilizer material. To illustrate, the UV light absorbing material(s) may include a UV A absorber, a UV B absorber, or a combination thereof. A UV A absorber may absorb UV A light in a first wavelength range of 315 nm to 400 nm. A UV B absorber may absorb light in a second wavelength range of 280 nm to 315 nm. While UV C light (in a third wavelength range of 100 nm to 280 nm) is absorbed in the ozone layer and atmosphere, it will be appreciated that a UV C absorber may also be used.

In a particular embodiment, a UV absorbing material includes an alkoxysilane material, such as a bridged alkoxysilane material. To illustrate, an organic bridged silane dye that absorbs in a particular UV range may be added throughout the silica matrix. Examples of such dyes include: 1,2-bis(4-(triethoxysilyl)phenyl)ethene, 1,2-bis(4-(2-triethoxysilylvinyl)phenyl)diazene, 1,2-bis(4-(2-triethoxysilylvinyl)phenyl)ethene, 4,4'-bis(4-(triethoxysilyl)vinyl)biphenylene, 4,4'-bis(4-(triethoxysilyl)styryl)biphenylene, 9,10-bis(4-(triethoxysilyl)styryl)anthracene, 9,10-bis(4-(triethoxysilyl)vinylanthracene, and N,N'-bis(3-triethoxysilylpropyl)-perylene-3,4:9,10-tetracarboxdiimide and the trimethoxysilyl analogs of the above dyes.

As an illustrative, non-limiting example, a UV absorbing silane such as 4,4'-bis(4-triethoxysilyl)styryl)biphenylene may be incorporated into the Stöber synthesis. In this example, the silane has an excitation wavelength of about 390 nm at 1.0 mole percent in silica. As the excitation wavelength is about 390 nm, this UV absorber may be acceptable for protecting against UV A wavelengths (in a wavelength range of 315 nm to 400 nm). As another example, a UV B absorbing silane may include triethoxy (phenyl)silane. Other UV absorbers may also be chosen to protect against other UV A wavelengths and UV B wavelengths. The amount of UV absorber may be varied, but less than 1.0 mole percent may be acceptable (in some cases). Particle size may be controlled using chemical concentration. For example, in the Stöber process, the concentration of water can be used to vary particle size. In a particular embodiment, the silica particle may be a silica "nanoparticle" having a characteristic dimension (e.g., an average diameter of a substantially spherical silica particle) in a range of 1 nm to 100 nm.

An illustrative, non-limiting example of a light stabilizer may include 4-(3-(dimethoxy(methyl)silyl)propoxy)-2,2,6,6-tetramethylpiperidine. Other examples of light stabilizers may include bis(3-hydroxy-4-benzoylphenoxy) diphenyl silane and/or bis(3-hydroxy-4-benzoylphenoxy) dialkyl(R) silane (where the R groups in the compounds include ethoxy groups, as examples). It will be appreciated that other light stabilizers (or combinations of stabilizers) may be selected. Further, the surface may also contain reactive groups for bonding with a polymer matrix. An amount of UV absorbing/light stabilizing silica that is utilized may vary based on properties of a particular polymer application and the particle size. Further, the polymer matrix to which the UAMLS silica particles are blended into can be used to control the rheological properties of the polymer matrix. In a particular embodiment, a modified Stöber process may be used to incorporate UV absorbing molecules and light stabilizer molecules into the matrix of the silica material.

In the particular embodiment illustrated in FIG. 2, the process 200 also includes surface modifying the UAMLS silica particle to include a functional group for bonding to a polymer matrix material, at 204. The particular functional group (or groups) that are added to the surface of the UAMLS silica particle may vary depending on the particular polymer matrix material that the UAMLS particle is to be bonded into.

Example 2: Matrix Modification to Include UV Absorber(s) and Light Stabilizer(s)

To a glass vial, 2M ammonia and water may be added to generate an ammoniacal solution. To a second vial, tetraethyl orthosilicate, 200 proof ethanol, a bridged UV absorber silane (e.g., less than 1.0 mole percent), and a light stabilizer silane (e.g., less than 1.0 mole percent) may be added to generate a monomer solution. The ammoniacal solution may be added to the monomer solution and stirred vigorously (e.g., for about 24 hours) or left static (e.g., for about 24 hours). Particles may be centrifuged, washed, and dried to remove unreacted silane, yielding UAMLS nanoparticles. Optionally, the UAMLS nanoparticles may be modified to include a functional group for bonding to a polymer matrix.

Thus, FIG. 2 illustrates an example of a process of forming a UAMLS silica particle that is matrix-modified to include both a UV light absorbing material (or multiple UV absorbing materials, such as a UV A absorber and a UV B absorber) and a light stabilizer material. The UV light absorbing material(s) convert short wavelength light into heat, and the light stabilizer material captures free radicals. The matrix-modified UAMLS silica particles formed according to the process illustrated in FIG. 2 can be blended with polymers, thus acting as rheology controllers and protecting the polymers from UV damage when exposed to UV light.

Figure 3:
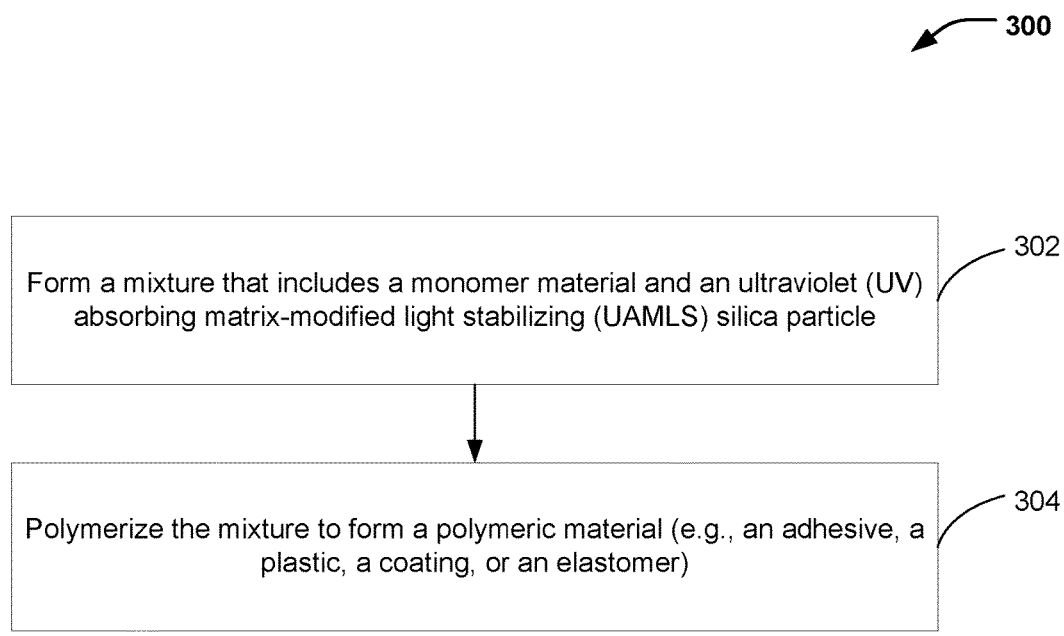
FIG. 3 is a flow diagram showing a particular embodiment of a process of forming a polymeric material having a UAMLS silica particle incorporated into a polymer matrix.

Referring to FIG. 3, a flow diagram illustrates a particular embodiment of a process 300 of forming a polymeric material having UAMLS silica particles incorporated into a polymer matrix. In some cases, the UAMLS silica particles may correspond to the matrix/surface modified UAMLS silica nanoparticles formed according to the process described herein with respect to FIG. 1. In other cases, the UAMLS silica particles may correspond to the matrix-modified UAMLS silica nanoparticles formed according to the process described herein with respect to FIG. 2.

The process 300 includes forming a mixture that includes a monomer material and a UAMLS silica particle, at 302. The silica particle includes a light stabilizer material and is matrix-modified to include a UV light absorbing material (or multiple UV absorbers, such as a UV A absorber and a UV B absorber). In some cases, as described further herein with respect to FIG. 1, the UV light absorbing material(s) may be incorporated into a matrix of the silica particle (e.g., using a modified Stöber process), and a light stabilizer material may be bonded to a surface of the matrix-modified silica material to form a UAMLS silica particle. In other cases, as described further herein with respect to FIG. 2, both the UV light absorbing material(s) and the light stabilizer material may be incorporated into a matrix of the silica particle (e.g., using a modified Stöber process) to form a UAMLS silica particle.

The process 300 also includes polymerizing the mixture to form a polymeric material, at 304. The UAMLS silica particles may provide rheological control. Thus, in some cases, the mixture may not include a separate rheology control additive. In a particular embodiment, the polymeric material that is formed includes an adhesive, a plastic, a coating, or an elastomer.

Thus, FIG. 3 illustrates an example of a process of forming a polymeric material that includes the UAMLS silica particles of the present disclosure to provide protection from UV damage when exposed to UV light.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A silica particle comprising:
   a silica matrix having an ultraviolet (UV) light absorbing material incorporated into the silica matrix; and
   a light stabilizer material bonded to a surface of the silica matrix, the light stabilizer material comprising 4-(3-(dimethoxy(methyl)silyl)propoxy)-2,2,6,6-tetramethylpiperidine bonded to the surface of the silica matrix.

2. The silica particle of claim 1, further comprising a surface modifier material that is different from the light stabilizer material.

3. The silica particle of claim 1, wherein the UV light absorbing material comprises an alkoxysilane material.

4. The silica particle of claim 3, wherein the alkoxysilane material is a bridged alkoxysilane material.

5. The silica particle of claim 4, wherein the bridged alkoxysilane material is 1,2-bis(4-(triethoxysilyl)phenyl)ethene, 1,2-bis(4-(2-triethoxysilylvinyl)phenyl)diazene, 1,2-bis(4-(2-triethoxysilylvinyl)phenyl)ethene, 4,4'-bis(4-(triethoxysilyl)vinyl)biphenylene, 4,4'-bis(4-(triethoxysilyl)styryl)biphenylene, 9,10-bis(4-(triethoxysilyl)styryl)anthracene, 9,10-bis(4-(triethoxysilyl)vinylanthracene, N,N'-bis(3-triethoxysilylpropyl)-perylene-3,4:9,10-tetracarboxdiimide, or a trimethoxysilyl analog thereof.

6. The silica particle of claim 1, wherein the UV light absorbing material comprises at least one of:
   a first UV light absorbing material to absorb UV A light in a first wavelength range of 315 nm to 400 nm; or
   a second UV light absorbing material to absorb UV B light in a second wavelength range of 280 nm to 315 nm.

7. The silica particle of claim 1, wherein the silica particle has a characteristic dimension in a range of 1 nm to 100 nm.

8. The silica particle of claim 1, wherein the UV absorbing material further comprises a UV light absorbing material to absorb UV C light in a third wavelength range of 100 nm to 280 nm.

9. The silica particle of claim 1, comprising less than 1.0 mole percent of the UV light absorbing material.

10. A polymeric material comprising:
    a silica particle incorporated into a polymer matrix, wherein the silica particle comprises:
      a silica matrix having an ultraviolet (UV) light absorbing material incorporated into the silica matrix; and
      a light stabilizer material bonded to a surface of the silica matrix, the light stabilizer material comprising 4-(3-(dimethoxy(methyl)silyl)propoxy)-2,2,6,6-tetramethylpiperidine bonded to the surface of the silica matrix.

11. The polymeric material of claim 10, wherein the UV light absorbing material comprises at least one of:
    a first UV light absorbing material to absorb UV A light in a first wavelength range of 315 nm to 400 nm; or
    a second UV light absorbing material to absorb UV B light in a second wavelength range of 280 nm to 315 nm.

12. The polymeric material of claim 10, wherein the silica particle has a characteristic dimension in a range of 1 nm to 100 nm.

13. The polymeric material of claim 10, wherein the UV light absorbing material further comprises a UV light absorbing material to absorb UV C light in a third wavelength range of 100 nm to 280 nm.

14. The polymeric material of claim 10, wherein the polymeric material is free of a separate rheology control additive.

15. The polymeric material of claim 10, wherein the polymeric material comprises an adhesive, a plastic, a coating, or an elastomer.

16. A process of forming a polymeric material, the process comprising:
    forming a mixture comprising a monomer material and a silica particle, wherein the silica particle comprises a silica matrix having an ultraviolet (UV) light absorbing material incorporated into the silica matrix, and a light stabilizer material bonded to a surface of the silica matrix, the light stabilizer material comprising 4-(3-(dimethoxy(methyl)silyl)propoxy)-2,2,6,6-tetramethylpiperidine bonded to the surface of the silica matrix; and
    polymerizing the mixture to form the polymeric material.

17. The process of claim 16, wherein the mixture is free of a separate rheology control additive.

18. The process of claim 16, wherein the polymeric material comprises an adhesive, a plastic, a coating, or an elastomer.

19. The process of claim 16, wherein the UV light absorbing material comprises at least one of:
    a first UV light absorbing material to absorb UV A light in a first wavelength range of 315 nm to 400 nm;
    a second UV light absorbing material to absorb UV B light in a second wavelength range of 280 nm to 315 nm; or
    a third UV light absorbing material to absorb UV C light in a third wavelength range of 100 nm to 280 nm.

* * * * *